US012767453B2

(12) United States Patent
Benedetti

(10) Patent No.: US 12,767,453 B2
(45) Date of Patent: Oct. 20, 2026

(54) APPARATUS FOR PROCESSING FRUIT AND VEGETABLE PRODUCTS

(71) Applicant: UNITEC S.P.A., Lugo (IT)

(72) Inventor: Luca Benedetti, Ravenna (IT)

(73) Assignee: UNITEC S.P.A., Lugo (IT)

( * ) Notice: Subject to any disclaimer, the term of this patent is extended or adjusted under 35 U.S.C. 154(b) by 54 days.

(21) Appl. No.: 18/861,794

(22) PCT Filed: Apr. 28, 2023

(86) PCT No.: PCT/EP2023/061350
§ 371 (c)(1),
(2) Date: Oct. 30, 2024

(87) PCT Pub. No.: WO2023/213729
PCT Pub. Date: Nov. 9, 2023

(65) Prior Publication Data

US 2025/0304379 A1 Oct. 2, 2025

(30) Foreign Application Priority Data

May 2, 2022 (IT) ........................ 102022000008729

(51) Int. Cl.
*B65G 43/08* (2006.01)
*B07C 5/02* (2006.01)
(Continued)

(52) U.S. Cl.
CPC ................ *B65G 43/08* (2013.01); *B07C 5/02* (2013.01); *G06T 7/0004* (2013.01); *G01N 21/00* (2013.01); *G06T 7/00* (2013.01); *G06T 2207/30242* (2013.01)

(58) Field of Classification Search
CPC ......... B65G 43/08; G06T 7/0004; G06T 7/00; B07C 5/02; G01N 21/00; G06M 7/00
See application file for complete search history.

(56) References Cited

U.S. PATENT DOCUMENTS

2017/0122793 A1* 5/2017 Giro Amigo ......... B65B 39/007
2018/0257109 A1* 9/2018 Benedetti ............. B07C 5/3422
(Continued)

FOREIGN PATENT DOCUMENTS

CN 104828568 A 8/2015
CN 106000914 A 10/2016
(Continued)

OTHER PUBLICATIONS

International Search Report for Application No. PCT/EP2023/061350, dated Aug. 1, 2023, 4 pages.
(Continued)

*Primary Examiner* — James R Bidwell
(74) *Attorney, Agent, or Firm* — CANTOR COLBURN LLP

(57) ABSTRACT

An apparatus for processing fruit and vegetable products, having at least first elements adapted to move containers of fruit and vegetable products, filled with indiscriminate masses of a specific type of product. along at least one first conveyance line, which leads to at least one device for emptying the containers, which is adapted to feed, with the fruit and vegetable products evacuated from the containers, second elements adapted to move fruit and vegetable products along at least one second conveyance line. The apparatus further includes a detection system, which is for the acquisition of at least one data item related to the content of the containers.

11 Claims, 5 Drawing Sheets

(51) Int. Cl.

| | |
|---|---|
| ***G01N 21/00*** | (2006.01) |
| ***G06T 7/00*** | (2017.01) |

(56) References Cited

U.S. PATENT DOCUMENTS

| | | | | |
|---|---|---|---|---|
| 2021/0116395 | A1* | 4/2021 | Ursella | G01N 23/046 |
| 2023/0133152 | A1* | 5/2023 | Barnehama | G06K 7/1413 382/141 |

FOREIGN PATENT DOCUMENTS

| | | | | |
|---|---|---|---|---|
| CN | 213139237 | U | 5/2021 | |
| EP | 2871980 | B1 | 9/2016 | |
| FR | 3025120 | A1 * | 3/2016 | B07C 5/342 |
| JP | S57178112 | A | 11/1982 | |
| JP | 2001286827 | A | 10/2001 | |
| JP | 3660707 | B2 | 6/2005 | |
| KR | 101886408 | B1 | 8/2018 | |
| WO | 2021019503 | A1 | 2/2021 | |

OTHER PUBLICATIONS

Italian Search Report for Application No. 102022000008729, dated Dec. 15, 2022, 8 pages.

Written Opinion for Application No. PCT/EP2023/061350, dated Aug. 1, 2023, 5 pages.

Australian Office Action for Application No. 2023264762, dated Feb. 6, 2026, 5 pages.

* cited by examiner

APPARATUS FOR PROCESSING FRUIT AND VEGETABLE PRODUCTS

CROSS-REFERENCE TO RELATED APPLICATIONS

This application is a 35 U.S.C. § 371 National Stage patent application of PCT/EP2023/061350, filed on 28 Apr. 2023, which claims the benefit of Italian patent application 102022000008729, filed on 2 May 2022, the disclosures of which are incorporated herein by reference in their entirety.

TECHNICAL FIELD

The present disclosure relates to an apparatus for processing fruit and vegetable products.

BACKGROUND

The sector of packaging and distribution of fruit and vegetable products is often entrusted to apparatuses and lines that are partially or completely automated, which execute a plurality of actions or processes on the various different types of product of interest, so as to prepare them for distribution to end users.

Such automation is in fact made necessary in order to reconcile contrasting needs like the need to satisfy a customer base that is increasingly numerous, demanding and price-conscious, on the one hand, and the need to meet quality standards that are continuously and increasingly evolving, on the other hand.

In more detail therefore, apparatuses are known which are fed with fruits (or other fruit and vegetable products) of the same type and which then move these fruits along a predefined path (a "line") which is affected by one or more stations the function of which is (for example) to select them, clean them, check them, size them, weigh them and, finally, divide them downstream in homogeneous groups into respective and separate collection stations, according to one or more parameters of interest.

According to a general configuration that is frequently adopted (for example for processing apples or cherries), feeding the apparatus entails the at least partially automated supplying of containers of various dimensions (cases, crates or bins), in which the products are placed indiscriminately, to a station the function of which is to overturn or in any case empty the containers, thus supplying the products to conveyance systems of various types (belts, chutes, rollers, fluid currents, etc.) which move them along the line affected by the various stations that carry out the processing.

Just as frequently, in a first portion of the line, the products emptied from the containers are poured onto the conveyance systems without any control on the specific position given to each one of them. Subsequently, in a second portion, it becomes necessary to make the products advance in an ordered manner (typically one at a time), in order to obtain information from each one of them about at least one parameter of interest (color, shape, size, sugar content, ripeness, possible rot, weight, etc.), in order to be able to subsequently route each product to the most appropriate collection station.

It is precisely this second portion that dictates the processing times of the apparatus, in that the elements involved in it are usually the ones that, owing to structural or technological limitations, define the maximum production capacity that can be obtained (in terms of number of products processed and effectively routed to the most appropriate collection station within the time unit).

To ensure maximum productivity it is therefore necessary to feed to the second portion of the line a number of products within the time unit that corresponds to the maximum capacity just mentioned: a lower number leads to drops in yield, while a greater number creates unwanted buildups and increases the risk of damaging the product and/or of having to discard it or feed it back into the system (and therefore leads again to drops in production yield).

Even when, for various reasons, it is chosen to make the apparatus operate at a lower level of productivity than the maximum, it is still necessary to feed to the second portion a constant number of products within the time unit, and any variation, upward or downward, will result in problems.

Against this, as mentioned, the products are supplied from containers in which they are collected indiscriminately, with no uniformity of filling and therefore with no way of knowing the number of products that are actually supplied to the line after the emptying of each container (except as an approximation).

Some known solutions seek to overcome this drawback by monitoring the transit of products along the first portion of the line mentioned just above, in order to be able to act on the speed with which the belt on which the products are conveyed moves them downstream (and therefore act on the number of products supplied downstream within the time unit), when a number of products is detected that is higher or lower than the number desired.

Such implementation solution is also however not devoid of drawbacks: the length of the line is usually short and the transfer speed is high, therefore often the information acquired upstream does not make it possible to intervene sufficiently in advance of the transit downstream, where therefore anomalies will still be generated at least temporarily.

Furthermore, the effectiveness of change to the transfer speed depends on the actual number of products that will be fed to the line in the moments immediately following, and which should compensate for the preceding irregularities, but again this is difficult to predict.

More generally, there are many possible cases that demonstrate the unpredictability of feeding (cases filled only partially, different size ranges of the batches which lead to a different number of products in each container for the same fill level, presence of foreign objects, etc.), but in any case the impossibility of knowing with precision the various parameters representing the mass of products in transit upstream (not just in terms of number) often constitutes a problem for various processing stations downstream.

SUMMARY

The aim of the present disclosure is to solve the above mentioned problems, by providing an apparatus that adopts adequate contrivances in order to ensure an optimal operation, even given the irregularities in, and unpredictability, of feeding.

Within this aim, the disclosure is to provide a method that makes it possible to ensure an optimal operation of an apparatus for processing fruit and vegetable products, even given the irregularities in, and unpredictability of, feeding.

A further feature of the disclosure is to provide an apparatus that adopts adequate contrivances in order to ensure the constancy of the number of products processed in the time unit, preferably but not necessarily according to the maximum productivity obtainable.

The disclosure also provides an apparatus, or a method, that makes it possible to detect anomalies of various kinds in the feed of products to be processed.

The disclosure further provides an apparatus that ensures a high reliability of operation.

Another feature of the disclosure is to provide an apparatus that adopts an alternative technical and structural architecture to those of conventional systems.

The disclosure also provides an apparatus that can be easily implemented using elements and materials that are readily available on the market.

The disclosure further provides an apparatus that is of low cost and safely applied.

This aim and these and other advantages which will become better apparent hereinafter are achieved by providing an apparatus and a method according to the claims.

BRIEF DESCRIPTION OF THE DRAWINGS

Further characteristics and advantages of the disclosure will become better apparent from the description of a preferred, but not exclusive, embodiment of the apparatus and of the method according to the disclosure, which are illustrated by way of non-limiting example in the accompanying drawings wherein.

DETAILED DESCRIPTION OF THE DRAWINGS

Figure 1:
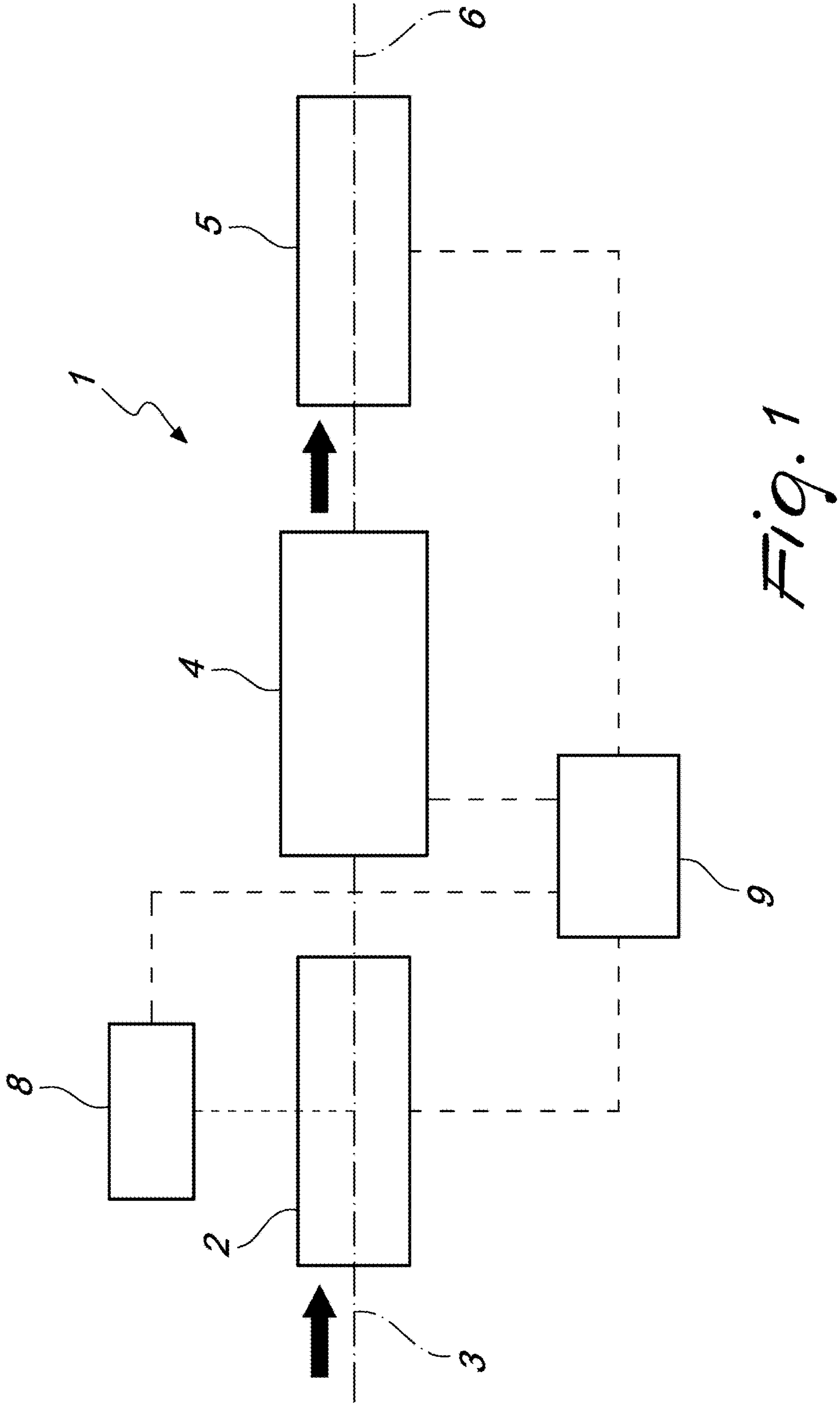
FIG. 1 is a block diagram of the apparatus according to the disclosure.

With particular reference to the figures, the reference numeral 1 generally designates an apparatus for processing fruit and vegetable products A.

Figure 3:
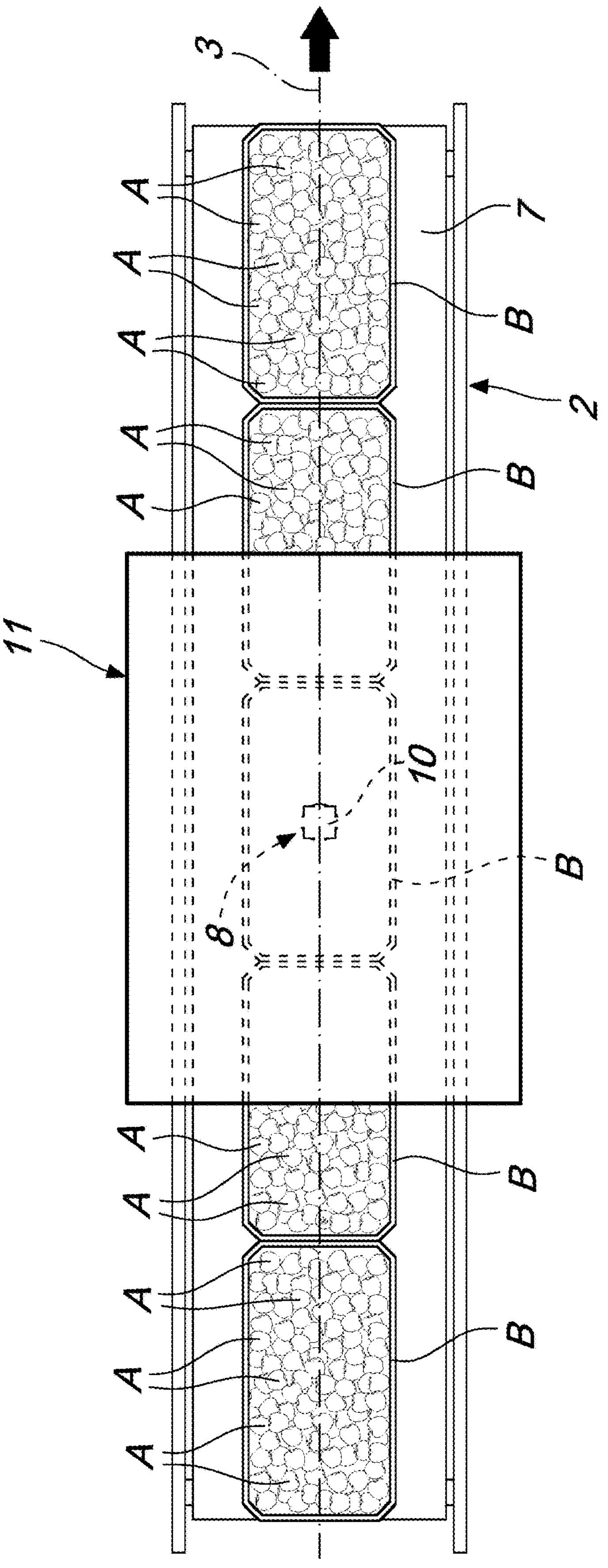
FIG. 3 is a plan view of the first conveyance line and the detection system.
Figure 4:
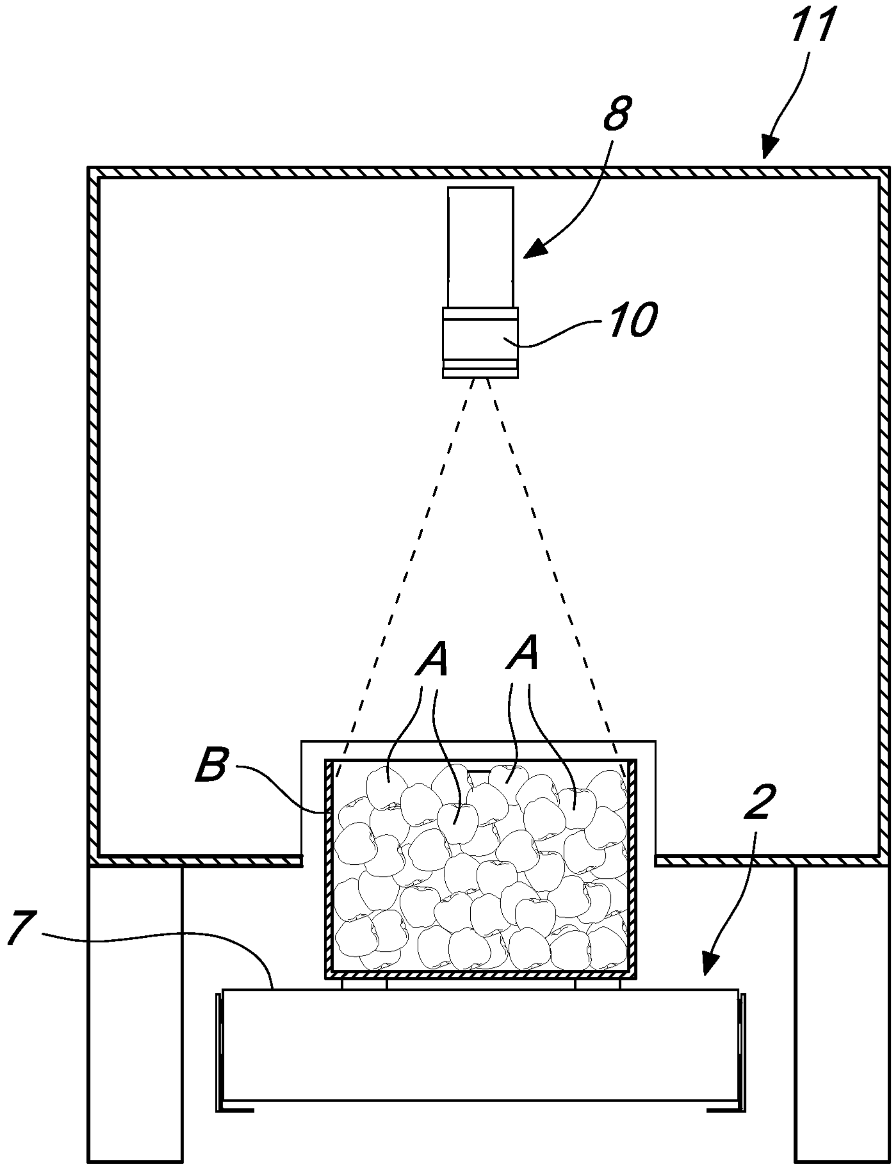
FIG. 4 is a cross-sectional view of the first conveyance line and the detection system, taken along a plane perpendicular to the advancement direction imposed on the products.
Figure 5:
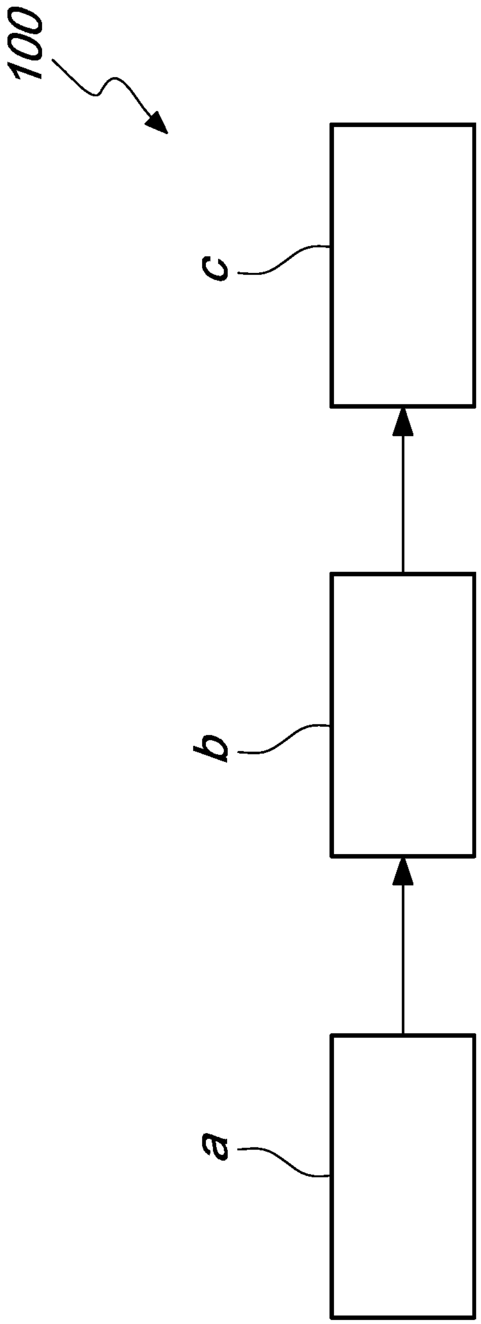
FIG. 5 is a block diagram of the method according to the disclosure.

In the accompanying FIGS. 3 and 4 the products A are apples, but it should be noted that this is a purely illustrative choice that in no way limits the scope of protection of the disclosure. The protection claimed herein extends in fact to any type of processing of any fruit, vegetable, or other horticultural product A. Furthermore, the apparatus 1 can be set up to process just one type of product A (apples or cherries for example) or it can be designed to handle two or more different products A, especially if they have similar shapes and other sorting criteria (peaches and kiwi fruit for example), usually allowing the apparatus to be changed from one type to the other after a simple configuration.

The apparatus 1 comprises at least first means 2 adapted to move containers B of fruit and vegetable products A along at least one first conveyance line 3. In the present discussion the term "line" means a path (typically but not necessarily straight) imposed on the products A, through the apparatus 1.

Typically, but not necessarily, the containers B are cases (for cherries for example), crates (for apples for example) or bins, parallelepiped in shape (with a substantially square or rectangular bottom, as in the accompanying figures), and are filled with indiscriminate masses of a specific type of product A, often arriving directly from the harvest fields.

The first line 3 leads to at least one device 4 for emptying the containers B, which in turn is adapted to feed, with the fruit and vegetable products A evacuated from the containers B, second means 5 adapted to convey these fruit and vegetable products A along at least one second conveyance line 6. It should be noted therefore that in the present discussion the terms "supply" and "supplying" must be understood (as is common practice in the technical sector of reference) to mean "feed" and "feeding" (products A).

The first means 2 can for example comprise a first conveyor belt 7 or a catenary, or a robot, and/or the like, which is capable of moving the containers B from a loading area (which can be manual, semiautomatic or automatic) until they reach the device 4, which operates typically (but not necessarily) automatically to empty the containers B and feed the products A (which are no longer accommodated in the containers B) freely to the subsequent second line 6.

For example, the device 4 can comprise an assembly for overturning the containers B, which lifts them and rotates them until the products A are poured out by gravity onto a tub passed through by a fluid current, onto a second conveyor belt, or onto any other element that forms part of the second means 5. The device 4 can also operate "in water", by immersing the products A in the tub or in a pool, in which a fluid current moves.

The device 4 can in any case be of a different type, while remaining within the scope of protection claimed herein.

It is likewise emphasized that both the first means 2 and the second means 5 can be of any type and the term "means" (be they the first or the second) includes the possibility to identify a single element that takes care of the movement along the entire respective line 3, 6 (as in the case of the first conveyor belt 7 for the first means 2, for example) or that there are more than one means, which receive and move the products A (or the containers B) along respective portions of the corresponding line 3, 6. For example, the second means 5 can comprise a second conveyor belt and, downstream of this, rollers or scoops that receive the products A from it and conveys them in an ordered manner.

In general however, in the present discussion the term "first line 3" is used to mean a more or less articulated path along which the first means 2 (which can be of a single type or can comprise two or more types arranged in series) take care of moving the containers B, inside which the products A are accommodated, while the "second line 6" is a path (also more or less articulated) along which the products A are transported (moved by the second means 5, which can also be of a single type or comprise two or more types arranged in series) after having been evacuated from the containers B.

In particular, according to methods that are well known in the sector, preferably but not necessarily a first portion of the second line 6 is affected by elements that move the products A downstream indiscriminately (without checking the specific position assumed by each one of them), while a second portion, preceded by an adequate ordered distribution assembly (or "separator") moves them one by one or in any case in a controlled manner, in order to allow actions to be executed on each one of them.

Even more specifically, in the preferred application (which does not limit the disclosure), in the first portion the products A are moved along indiscriminately while they are subjected to washing, preselection, cleaning, removal of debris, or the like. In the second portion, there are one or more electronic video cameras or similar vision elements which, by virtue of specially-designed optical processing software programs make it possible to measure, for each product A, one or more parameters of interest, such as for example color, shape, dimensions, sugar content, ripeness, possible rot, weight, etc. On the basis of such measurements, downstream the products A are routed to different unloading stations, so as to collect the products A into homogeneous subgroups.

In any case, up to this point it should be noted that these solutions are well known in the art, and will not be discussed further in the discussion below in that they are fully known to the person skilled in the art.

It should likewise be noted that the terms "upstream" and "downstream" are used here in their common meanings and refer to the direction of motion imposed by the means 2, 5 on the products A through the apparatus 1.

According to the disclosure, the apparatus 1 comprises a detection system 8, which is configured to acquire at least one data item related to the content of the containers B (which are to be fed to the device 4). The system 8 can be configured to act while the containers B are moving toward the device 4 (or in any case along the first line 3) or it can also act at a moment when they are kept temporarily stationary. The two options are included in the scope of protection claimed herein and in the discussion below, and the wording "containers B in transit" which will be used in the discussion below should be understood to refer to both. Furthermore, it should be noted that the system 8 can be arranged at any point that enables it to acquire the data item of interest related to the containers B that accommodate the products A, wherever they are, and therefore, for example, while the containers B are located along the first line 3 (along any point thereof) or when they have already been received by the device 4.

The system 8 acquires preferably at least one data item for each container B, but it can also be configured to operate only on samples, on some containers B and not on all of them.

The choice to have the system 8 in a section so far upstream with respect to the entire path imposed on the products A through the apparatus 1 (even before they are evacuated from the containers B) makes it possible to achieve the set aim, because it makes it possible to acquire information far enough in advance to be useful downstream, at various points, for the optimization of the operation of the apparatus 1.

In this regard, at least one data item will be acquired for each container B in transit and the apparatus 1 (at least one station thereof) will be 20 acted on at the first value that is deemed anomalous or in any case deserving of action. Likewise, each data item acquired can be used for a constant adjustment of the operating parameters (of at least one station) of the apparatus 1.

In particular, in the preferred embodiment the system 8 is configured for the transmission of the data item (of each data item acquired) to an electronic control and management unit 9, which operates at least as a function of the data items detected. The expression "operate as a function of the data item" means that the scope of protection claimed herein includes the possibility that the electronic unit 9 is capable of intervening (in any manner) on a subassembly or station (any one) of the apparatus 1, which are arranged (preferably but not necessarily) downstream of the first line 3, controlling them and commanding them as a function of the data items acquired by the system 8.

The electronic unit 9 can be of any type, and for example it can be a controller, a PLC or an electronic computer; it can furthermore be dedicated solely to processing the data items acquired by the system 8 and hence to intervening as a consequence, or it can be a controller or a PLC that also performs other tasks. Typically however, it is the same electronic element that oversees and governs the operation of the entire apparatus 1.

It should be noted that the choice to use the data items acquired downstream of the first line 3 constitutes a preferred but not exclusive application, in that the possibility is not ruled out of commanding, as a function of said data items, the first means 2 or other subassembly or station that acts along the first line 3.

The methods of acquisition of the data item by the system 8 can be of any type and can involve for example instruments of the mechanical and/or electronic type, including as a function of the specific type of data item that it is desired to collect.

In particular, in an embodiment of significant practical interest, the detection system 8 comprises at least one electronic vision apparatus 10. In this regard, such apparatus 10 is arranged inside a tunnel 11 (as in the solution shown in the accompanying figures, which is illustrative and does not limit the disclosure): at least one portion of the first line 3 can in such case be located inside the tunnel 11. In the tunnel 11, the apparatus 10 can act while the containers B are moved along the path identified by the first line 3 or it can also act at a moment when they are deliberately kept stationary.

Figure 2:
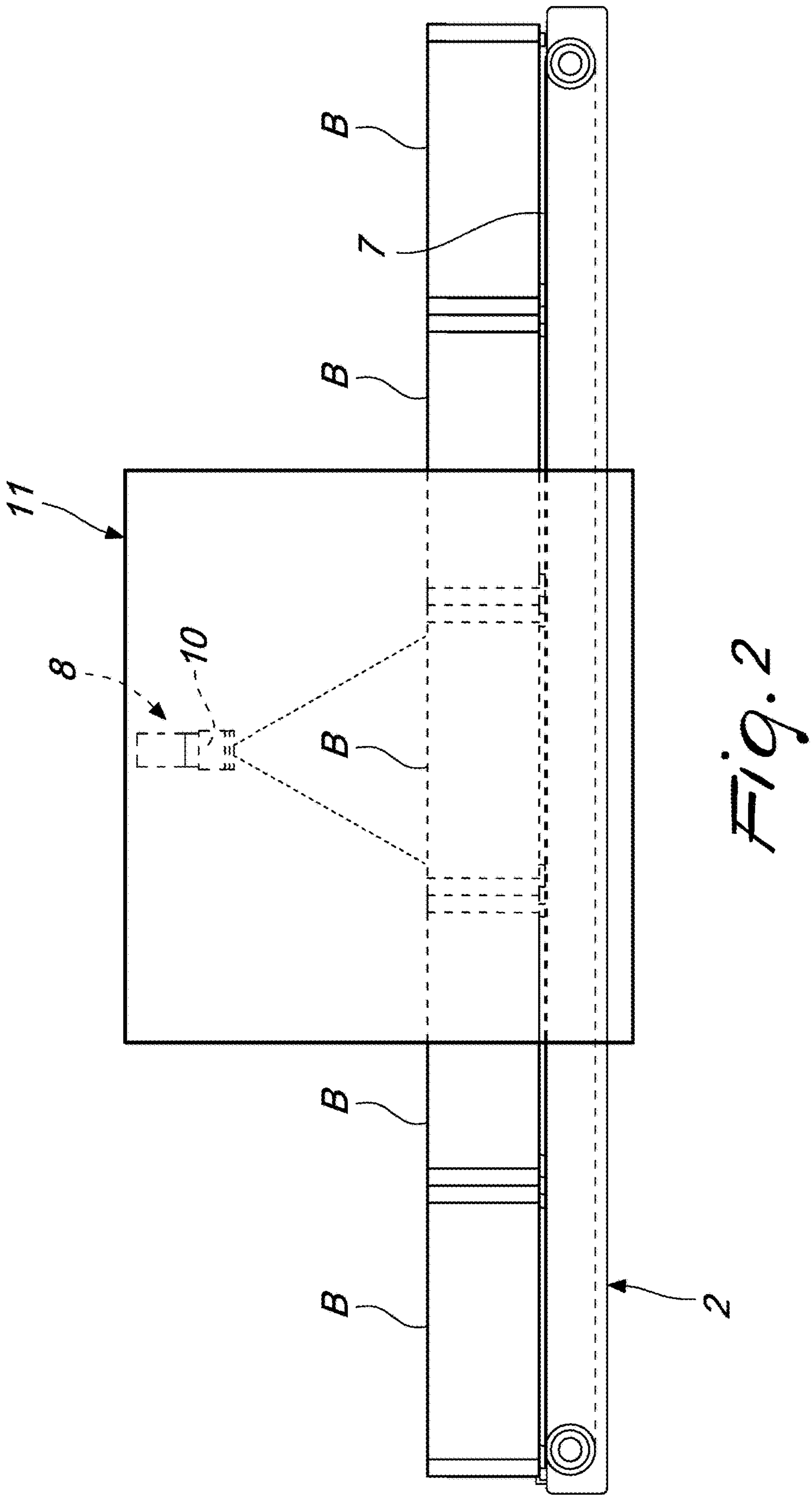
FIG. 2 is a side view of the first conveyance line and the detection system.

With reference for example to FIG. 2, one or more electronic video cameras (or other electronic vision apparatuses 10) are thus arranged along the first line 3 and direct their field of view toward the first line 3 and therefore toward the containers B in transit (filled with products A) and make use of optical processing software (optionally chosen to be of known type) to acquire the data item of interest.

In a first embodiment of significant practical interest, which in any case is not exclusive, the detection system 8 is configured at least to estimate and/or measure the number of products A accommodated in at least some containers B. In the discussion below, the term "estimate" means a verification with the objective of supplying a number that is (deliberately) only approximate, while "measure" consists of a calculation that aims to return the exact value, or a value that is as precise as possible. In this regard, the estimate and/or measuring can be conducted according to various methods, for example using a weighing scale, or a mechanical probe or a photocell capable of estimating the height of the mass of products A in each container B: if we know the average dimensions and bulk of the products, it will then be possible to correlate the height of the entire mass with a data item that corresponds to the overall number of products A accommodated, although approximated more roughly in this case.

Such measuring can likewise be conducted, more accurately, with a system 8 that comprises (or is constituted by) a vision apparatus 10, equipped with software capable of extrapolating the number of products A (with greater or lesser approximation) from the images acquired of the products A in transit. In such case, the apparatus 10 can be limited to view the surface layer of products A in each container B: the total number of products A can be measured or at least estimated by quantifying the number of products A in the observed surface layer and multiplying this number by a factor that takes account of the filling percentage of the container B (which can also be deduced in various ways).

The system 8 can likewise avail of investigative sensors and instruments of other kinds, according to requirements.

The number of products A thus detected can be obtained on samples only, for some containers B in transit, or preferably for each one of them, according to the specific requirements.

Usefully, in the preferred embodiment, the electronic unit 9 is equipped with instructions for controlling the device 4 and for varying the number of containers B to be emptied within the time unit (by the device 4), as a function of the data items acquired by the detection system 8. Preferably, in this case the unit 9 will likewise take care of adjusting the operation of the first line 3, in order to supply more or fewer containers B to the device 4. Equivalently, we can say that the electronic unit 9 is equipped with instructions for varying the number of products A discarded downstream within the time unit, by the device 4. In any case, the instructions with which the electronic unit 9 is equipped are such as to ensure that the number of products A supplied within the time unit to at least one fraction of the second line 6 is kept constant (according to different possible logic schemes, which will be explained below).

So, for example, the electronic unit 9 can act on the speed of the actuators that are used to overturn (rotate) the containers B (or on other operating parameters), in order to ensure that the products A are poured by gravity more or less rapidly onto the second line 6. Alternatively, considering that in some applications, after the execution of an emptying cycle there is a wait time before the execution of the subsequent emptying cycle, the duration of this wait time can be reduced.

In this context, preferably the detection system 8 will be configured exactly as explained just now, to estimate or measure the number of products A accommodated in each container B: depending on whether there is a lesser or greater number of products A in each container B, the electronic unit 9 can correspondingly increase or decrease the number of containers B to be emptied within the time unit, and therefore ensure the constancy of the number of products A supplied within the time unit in at least one fraction of the second line 6. It has been seen in fact that typically a section of the second line 6 is affected by stations and instruments that individually process each product A (in order to acquire information on at least one parameter of interest and so route it to the most appropriate unloading area): the number of products A that it is desired to ensure within the time unit preferably corresponds to the number that corresponds to the maximum productivity that can be reached by such stations (typically, the bottleneck of the apparatus 1). Even when it is not desired to ensure maximum productivity, for example to cater to specific requirements of the user of the apparatus 1, then maintaining the constancy of products A supplied ensures a correct operation.

In a different embodiment, the electronic unit 9 is equipped with instructions for controlling the second means 5 and therefore for varying the advancement speed of the products A along at least one section of the second line 6, as a function of the data items acquired by the detection system 8. In this case too, we can ensure the constancy of products A supplied within the time unit to a given section of the second line 6, by acting on the advancement speed in the upstream portions (if this intervention can be carried out sufficiently far in advance).

Moreover, the possibility is not ruled out of obtaining a similar result by estimating or measuring the number of products A accommodated in each container B in transit along the first line 3 and, as a consequence, acting directly on the speed with which those containers B are moved on said first line.

In a second embodiment of significant practical interest, the detection system 8 is configured at least to verify the presence, in the containers B, of foreign objects such as stalks (or stems, or peduncles) coupled to the products A, stones, branches, leaves, soil, debris of other kinds, and the like.

In particular, with further reference to the latter embodiment, the electronic unit 9 can be equipped with instructions to activate countermeasures (of any type, including as a function of the type of foreign object detected) aimed at avoiding the risk of any damage as a consequence of the presence of foreign objects (throughout the apparatus 1), detected by the system 8.

For example, for stones or other bodies that are particularly heavy and cumbersome, the electronic unit 9 can trigger an alarm to request intervention by the operators or, automatically, it can stop the advancement downstream of the relevant container B or in any case ensure that the device 4 does not supply the relevant contents to the second line 6, in that such objects could damage the products A or, worse, the components of the apparatus 1. For other foreign objects (soil, leaves and various impurities), the electronic unit 9 can activate elements for washing or cleaning which are located downstream, preferably along the second line 6.

It is possible for the detection system 8 to be configured both to estimate and/or measure the number of products A and also to check for the presence of foreign objects.

In an additional embodiment of significant practical interest, the detection system 8 is configured at least to estimate and/or measure the length of any stalks (or stems, or peduncles) coupled to the products A accommodated in the containers B. This functionality can be the only one carried out by the system 8 or the system can also be configured for one or more of the various checks described in the foregoing paragraphs (or for still other checks).

As is known, when two products A (typically cherries) are found coupled to each other at the respective stalks, joined to each other at the end of the stalk in common, opposite to the ends joined to the products A themselves, it is necessary to remove this encumbrance, in order not to compromise the correct operation of the apparatus 1, and it is necessary to intervene at the end that is in common, in order to keep each stalk intact. The data item relating to the length of the stalks can enable the electronic unit 9 (or other element informed by the system 8) to activate the necessary countermeasures in the most appropriate manner.

In particular, the apparatus 1 can comprise a station for separating any pairs of mutually connected stalks: in such case, the electronic unit 9 can be equipped with instructions for configuring the separation station as a function of the data item related to the length of the stalks, which as has just been seen can be detected by the system 8.

One separation station that can be used in this manner is for example the station described in EP2871980B1 or in the relevant Italian priority document no. 102012902066907. As illustrated in that patent, the separation station can therefore comprise a fixed structure connected to a movable structure via a plurality of moving arms, each one being connected, with a first end, to a position in the fixed structure and, with the other end, to a respective position of the movable structure, with the two ends of the same arm arranged on two different straight lines. Thus, the movable structure can be moved with respect to the fixed structure, in a translational motion following a rotatory path, similar to the movement of a parallelogram. The separation is carried out by cutting modules arranged in succession above a flat surface defined by two parallel longitudinal members belonging to the fixed structure; these modules are provided with rotating shafts which have a plurality of rotating blades and have axes that are integral with the movable structure via adapted connecting and supporting elements.

The checking for the presence of foreign objects and/or the estimating and/or measuring of the length of the stalks can also be conducted in any manner.

It should be noted that the various examples illustrated up to this point, regarding the data item acquired by the system 8, do not exhaust the possibilities encompassed in the scope of protection claimed herein; furthermore, the possibility exists that the system 8 is capable of acquiring two or more different data items, from the data items already described and/or other data items.

The present disclosure is directed, in addition to the apparatus 1 described up to this point, also to a method 100 of controlling such apparatus (in which therefore the apparatus 1 is provided with at least some of the specifications illustrated above and at least the means 2, 5, the lines 3, 6, the emptying device 4 and the detection system 8).

The method 100 according to the disclosure consists, in a step a., in acquiring, by means of the system 8, at least one data item related to the content of the containers B.

Furthermore, the method 100 entails, in a step b., comparing the data items obtained in step a. with a reference value.

Subsequently, in a step c. the method 100 consists in acting on the apparatus 1 (in any manner), preferably downstream of the first line 3, at least if the data obtained in the step a. differ from the reference value by more than a predefined tolerance limit. In step c. therefore the electronic unit 9 or other instrument operate as a function of the data item, in the (generic) sense already explained in the foregoing pages.

It should be noted that the reference value (like the data item) can be of any type: if for example the system 8 is configured to check for the presence of foreign objects, then the reference value will simply be the "absence" of these (or a maximum size that is considered acceptable). If the data item is the length of the stalks, then the reference value could be a null length, or a length corresponding to the length for which the cutting station is set at that moment (as long as the length is not changed, it is not necessary to intervene to recalibrate it).

Steps a. and b. are preferably executed for each container B in transit in a sort of ongoing check or adjustment. However, the possibility is not ruled out of operating on a sample basis.

In particular, in an embodiment of the method 100 that is of significant practical interest, step a. consists in estimating or in measuring, at least approximately, the number of products A accommodated in at least some containers B (and preferably in all of them). In such case, step b. compares the data items obtained in step a. with a reference value, chosen as a function of the desired number of products A to be supplied, within the time unit, at least to a predefined section of the second line 6. In this context, step c., if the data items obtained in step a. differ from the reference value by more than a predefined tolerance limit, varies at least one operating parameter of the apparatus 1, and preferably of the emptying device 4, in order to restore the correspondence between the number of the products A in transit and the reference value (for example by increasing or decreasing the number of containers B to be emptied within the time unit). This is in order 20) to ensure the constancy of products A supplied within the time unit, for the reasons already explained.

The operation of the apparatus according to the disclosure has already been explained: in particular, it has been seen that the products A are moved along the first line 3 accommodated in containers B, until they reach a device 4 that empties these containers along the second line 6, in order to subject the products A to various forms of processing.

The peculiar and innovative choice to acquire at least one data item related to the products A when these are still accommodated in the containers B (in the first part of the path that they follow through the apparatus 1) makes it possible to intercept, far in advance (with respect to conventional solutions), defects or anomalies in the filling of the containers B and/or for example to know the number of products A that are about to be sent downstream, and also to acquire information of other type such as the presence of stalks or unwanted debris, so as to activate the appropriate countermeasures in time. This makes it possible to ensure an optimal operation, even given the irregularities in and unpredictability of the feeding (of any type), and to appropriately correct the anomalies, preferably but not necessarily in order to ensure the maximum productivity obtainable.

In particular, if it is decided to use the data item acquired (be it the number of products A accommodated in each container B or another data item) to adjust the frequency with which the products A are emptied from the containers B (or transferred by the second means 5), then it is possible to compensate for any irregularities in the filling of the containers B and ensure a constant flow of products A downstream (in terms of number of products A supplied within the time unit), right where said products need to be fed with constant spacing, dictated by the technological limitations or requirements of the instruments involved.

The disclosure, thus conceived, is susceptible of numerous modifications and variations, all of which are within the scope of the appended claims. Moreover, all the details may be substituted by other, technically equivalent elements.

In the embodiments illustrated, individual characteristics shown in relation to specific examples may in reality be substituted with other, different characteristics, existing in other embodiments.

In practice, the materials employed, as well as the dimensions, may be any according to requirements and to the state of the art.

The invention claimed is:

1. An apparatus for processing fruit and vegetable products, which comprises at least first means adapted to move containers of fruit and vegetable products, filled with indiscriminate masses of a specific type of product, along at least one first conveyance line, which leads to at least one device for emptying the containers, which is adapted to feed, with fruit and vegetable products evacuated from the containers, second means adapted to move said fruit and vegetable products along at least one second conveyance line, and further comprising a detection system which is configured for an acquisition of at least one data item related to a content of the containers filled with products before the products are evacuated from the containers by the device for emptying the containers.

2. The apparatus according to claim 1, wherein said system is configured for a transmission of said at least one data item to an electronic control and management unit, which operates at least as a function of said at least one data item.

3. The apparatus according to claim 1, wherein said detection system) comprises at least one electronic vision apparatus.

4. The apparatus according to claim 1, wherein said detection system is configured at least to estimate and/or measure a number of fruit and vegetable products accommodated in at least some of said containers.

5. The apparatus according to claim 1, wherein said detection system is configured at least to verify a presence, in the containers, of foreign objects such as stalks coupled to the fruit and vegetable products, stones, branches, leaves, soil, debris of other kinds.

6. The apparatus according to claim 5, wherein said electronic control and management unit is provided with instructions for activation of countermeasures aimed at avoiding a risk of any damage due to the presence of foreign objects.

7. An apparatus for processing fruit and vegetable products, which comprises at least first means adapted to move containers of fruit and vegetable products, filled with indiscriminate masses of a specific type of product along at least one first conveyance line, which leads to at least one device for emptying the containers, which is adapted to feed, with fruit and vegetable products evacuated from the containers, second means adapted to move said fruit and vegetable products along at least one second conveyance line, and further comprising a detection system which is configured for an acquisition of at least one data item related to a content of the containers, wherein said system is configured for a transmission of said at least one data item to an electronic control and management unit, which operates at least as a function of said at least one data item, and wherein said electronic control and management unit is equipped with instructions for controlling said device for emptying the containers, and for varying the number of containers to be emptied in a time unit, as a function of the data acquired by said detection system.

8. An apparatus for processing fruit and vegetable products, which comprises at least first means adapted to move containers of fruit and vegetable products, filled with indiscriminate masses of a specific type of product along at least one first conveyance line, which leads to at least one device for emptying the containers, which is adapted to feed, with fruit and vegetable products evacuated from the containers, second means adapted to move said fruit and vegetable products along at least one second conveyance line, and further comprising a detection system which is configured for an acquisition of at least one data item related to a content of the containers, wherein said detection system is configured at least to verify a presence, in the containers, of foreign objects such as stalks coupled to the fruit and vegetable products, stones, branches, leaves, soil, debris of other kinds, and wherein said detection system is configured at least to estimate and/or measure a length of any stalks coupled to the fruit and vegetable products accommodated in the containers.

9. The apparatus according to claim 8, further comprising a separation station for separating any pairs of mutually connected stalks, said electronic control and management unit being equipped with instructions for configuring said separation station as a function of the data item related to the length of the stalks, detected by said system.

10. A method for controlling an apparatus for processing fruit and vegetable products, the apparatus comprising at least first means adapted to move containers of fruit and vegetable products, filled with indiscriminate masses of a specific type of product along at least one first conveyance line, which leads to at least one device for emptying the containers, which is adapted to feed, with fruit and vegetable products evacuated from the containers, second means adapted to move said fruit and vegetable products along at least one second conveyance line, and further comprising a detection system which is configured for an acquisition of at least one data item related to a content of the containers, the method including the following steps:

a. acquiring, by said detection system, at least one data item related to a content of the containers, b. comparing the data obtained in said step a. with a reference value, and c. acting on said apparatus, downstream of said first conveyance line, at least if the data obtained in said step a. differ from the reference value by more than a predefined tolerance limit.

11. The method according to claim 10, wherein said step a. comprises estimating or measuring the number of products accommodated in at least some containers, said step b. comparing the data obtained in said step a. with a reference value, chosen as a function of a desired number of fruit and vegetable products to be supplied in a time unit at least to a predefined portion of said second conveyance line, said step c., if the data obtained in said step a. differ from the reference value by more than the predefined tolerance limit, varying at least one operating parameter of said apparatus, and of said device, in order to restore a match between the number of fruit and vegetable products in transit and said reference value.

* * * * *